United States Patent [19]

Allain et al.

[11] 4,248,838
[45] Feb. 3, 1981

[54] PREPARATION OF USEFUL MGCL$_2$. SOLUTION WITH SUBSEQUENT RECOVERY OF KCL FROM CARNALLITE

[75] Inventors: Ronald J. Allain, Richmond, Tex.; David G. Braithwaite, Gulf, Fla.; Joseph P. Maniscalco, Sugarland, Tex.

[73] Assignee: Nalco Chemical Company, Oak Brook, Ill.

[21] Appl. No.: 22,396

[22] Filed: Mar. 21, 1979

[51] Int. Cl.$^3$ ............................................. C01F 5/34
[52] U.S. Cl. ................................ 423/162; 23/293 R; 203/12; 423/498
[58] Field of Search ............... 423/162, 163, 197, 498; 23/304, 293 R; 203/12, 14

[56] References Cited

U.S. PATENT DOCUMENTS

| | | | |
|---|---|---|---|
| 3,355,212 | 11/1967 | Day | 23/304 |
| 3,642,454 | 2/1972 | Nylander | 23/304 |
| 3,966,888 | 6/1976 | Braithwaite et al. | 423/351 |
| 3,983,224 | 9/1976 | Allain et al. | 423/351 |

OTHER PUBLICATIONS

Brown et al., "Drying Liquid Hydrocarbons Via Fractional Distillation", Chemical Engineering Progress, (vol. 66, No. 8), Aug. 1970, pp. 54-60.

*Primary Examiner*—O. R. Vertiz
*Assistant Examiner*—Wayne A. Langel
*Attorney, Agent, or Firm*—John G. Premo; Robert A. Miller

[57] ABSTRACT

This invention outlines a process to beneficiate carnallite ores in such a way as to obtain anhydrous MgCl$_2$ of sufficient purity to be used as feed for an electrolysis cell producing magnesium metal. Commercially acceptable potassium chloride as also recovered. The organic solvents and the anhydrous ammonia used to obtain the beneficiation of these carnallite materials are recovered for recycle in the process.

2 Claims, No Drawings

PREPARATION OF USEFUL MGCL$_2$ SOLUTION WITH SUBSEQUENT RECOVERY OF KCL FROM CARNALLITE

In the process of manufacturing magnesium metal, the electrolysis of anhydrous magnesium chloride in a molten salt eutectic is normally practiced. The magnesium metal is separated from the bath and electrolysis cell by flotation in molten baths that contain primarily MgCl$_2$, KCl, and NaCl along with additional CaCl$_2$ salts. Other eutectic "mixed" salt baths used to recover magnesium metal have included molten baths containing MgCl$_2$-LiCl mixtures with other salts such as KCl, BaCl$_2$, NaCl, and CaCl$_2$. Various types of trace metal, such as vanadium salts may be added to the mixed baths to enhance their electrolysis characteristics.

One of the more profound difficulties found in operating an electrolysis procedure to manufacture magnesium metal is the build up of cell "smut", which is primarily magnesium oxides, in the salt bath. This "smut" is not soluble in the eutectic molten baths and accumulates on electrodes, in flow paths, and generally throughout the equipment in contact with the molten salt bath. The presence of this "smut" is harmful to the electrolysis cell operation. It's presence is caused primarily by insufficiently dried magnesium chloride which is used as a cell feed during continued electrolysis.

Recently, new procedures have been developed to obtain high quality anhydrous magnesium chloride. These processes are described in U.S. Pat. No. 3,983,224 and in U.S. Pat. No. 3,966,888 both issued to Allain, et al. The patents issed to Allain, et al, describe a process which successfully manufactures extremely high quality anhydrous MgCl$_2$ from MgCl$_2$ hydrate salts or concentrated MgCl$_2$ aqueous solutions. The starting materials are admixed with ethylene glycol, exposed to temperatures sufficient to distill from these admixtures all water initially present, leaving an anhydrous ethylene glycol solution of MgCl$_2$. This anhydrous ethylene glycol-MgCl$_2$ solution is treated with anhydrous ammonia forming the insoluble MgCl$_2$.6NH$_3$-hexa ammoniate salt which precipitates and is then filtered from this glycol-MgCl$_2$.6NH$_3$ slurry. Subsequent unique washing steps, solvent recovery steps, and a final roasting process which drives off ammonia (for recycle) and recovers high quality MgCl$_2$ (anhydrous) completes the process.

One of the difficulties of the economic operation of the above process outlined by Allain, et al, is the source of the MgCl$_2$ hydrates salts or concentrated solutions. Brines, bitterns, and even sea water may be used to recover these hydrated MgCl$_2$ salts or concentrated aqueous solutions. It would be beneficial to also use various types of naturally occurring mineral ores or mixed salts containing magnesium values if a process could be found to simply and economically convert these mineral ores and mixed salts to anhydrous MgCl$_2$.

We have discovered that we can easily achieve the beneficiation of certain ores containing magnesium values, and by such beneficiation open up many geographic locations to possible economic consideration as sites to manufacture MgCl$_2$ (anhydrous) and possibly even magnesium metal.

We have particularly discovered a process to convert the carnallite double salts to anhydrous magnesium chloride and KCl. This simple process can be practiced utilizing an ethylene glycol recirculation along with an anhydrous ammonia loop which allows the recovery of anhydrous magnesium chloride and recovery and recycle of all solvents used as well as anhydrous ammonia. This procedure surprisingly yields an anhydrous magnesium chloride of sufficient quality to act as electrolysis cell feed for the manufacture of magnesium metal.

THE INVENTION

We have discovered a method of beneficiating a mixed salt mineral ore containing potassium chloride and magnesium chloride and/or their hydrates which allows the recovery of anhydrous magnesium chloride and the simultaneous recovery of commercially acceptable potassium chloride. These mixed salts-mineral ores are most commonly referred to as carnallites. This beneficiation of these mixed salt minerals, such as the carnallites, allows the separation and isolation of two critical and economically valuable inorganic salts. These two salts are anhydrous magnesium chloride and potassium chloride. This method of beneficiation of these carnallite mineral ores which contain potassium chloride and magnesium chloride comprise the following steps:

(a) Dissolving the carnallite mineral ores in the minimum amount of water required to obtain complete solubility, thereby obtaining a carnallite solution;

(b) Filtering from the carnallite solution of (a) any residual precipitates which are not soluble in said solution, thereby obtaining a filtered solution;

(c) Adding ethylene glycol to the filtered solution of (b) in sufficient quantities to solubilize all magnesium chloride present in said filtered solution, thereby obtaining an ethylene glycol-water-carnallite solution;

(d) Dehydrating the ethylene glycol-water-carnallite solution of step (c) by distilling water therefrom, thereby obtaining an anhydrous solution of magnesium chloride in ethylene glycol which may contain up to about 2.0% potassium chloride (by weight) and a precipitate of anhydrous potassium chloride, said precipitate then being removed and recovered from said solution of magnesium chloride in ethylene glycol;

(e) Adding anhydrous ammonia to the anhydrous solution of magnesium chloride in ethylene glycol, thereby forming a complex precipitate of MgCl$_2$.6NH$_3$ which may contain small quantities of KCl, said precipitate being filtered from the solution, washed with a low molecular weight solvent for ethylene glycol, said solvent having been saturated with anhydrous ammonia prior to washing said precipitate and recovering said washed precipitate of anhydrous MgCl$_2$.6NH$_3$;

(f) Heating the MgCl$_2$.6NH$_3$ of (e) to temperatures sufficient to drive off all ammonia, thereby recovering anhydrous magnesium chloride.

It is noted in step (e) that it is possible to remove trace quantities of potassium chloride from the MgCl$_2$.6NH$_3$/glycol cake by washing it with methanol saturated with ammonia in quantities sufficient to remove the potassium chloride. This is a surprising discovery since one would expect that the ammonia saturated methanol would not selectively extract the potassium chloride from the magnesium chloride ammoniate-glycol filter cake.

The sequence of steps outlined in the previous paragraphs allows for the production of anhydrous magnesium chloride of sufficient quality to be used as cell feed in an electrolysis cell recovering magnesium metal. In addition, it also allows the recovery of potassium chloride of sufficient quality to be used commercially.

Another operation that is preferred in this invention is the simultaneous dissolution and precipitation reactions that occur when water-ethylene glycol solutions are added to the original carnallite mineral ores. This mixture is then stirred and maintained at sufficient temperature to allow the solubilization of the mixed potassium and magnesium chloride making up the carnallite mineral ores. This solution, after treatment to remove any remaining suspended solids, is then dehydrated by distilling water therefrom, thereby obtaining an anhydrous solution of magnesium chloride in ethylene glycol which may contain up to about 2% potassium chloride (by weight). From this point on the procedures outlined above are followed to recover both the anhydrous magnesium chloride, potassium chloride as well as to recover and recycle the ethylene glycol, anhydrous ammonia, the low molecular weight solvent which is used to recover the glycol that is entrained in the magnesium chloride ammonia complex precipitate and to remove KCl from this complex precipitate.

It has been found that the use of a carnallite which contains water of hydration, for example—$MgCl_2 \cdot KCl \cdot 6H_2O$, allows the use of ethylene glycol without the addition of more water to solubilize the carnallite material containing water of hydration. As an example of such a procedure, we present the possibility of adding sufficient hydrated carnallite as described above to ethylene glycol, such that a solution of magnesium chloride in the ethylene glycol after dehydration and removal of precipitated KCl would be between 8-10 weight percent. This solution is then heated to temperatures sufficient to distill from this solution the water of hydration contained in the original carnallite. As this distillation proceeds, the potassium chloride precipitates from the solution and may be recovered as described above. When the solution is totally anhydrous, the potassium chloride is removed by techniques described or anticipated above, and the magnesium chloride-ethylene glycol solution which may contain up to 2.0 weight percent potassium chloride is treated with anhydrous ammonia to form the magnesium chloride-/ammonia complex precipitate and recovery steps are followed as described above. Subsequent to the recovery steps mentioned, anhydrous magnesium chloride is recovered, ethylene glycol is recovered and recycled, anhydrous ammonia is recovered and recycled, and the low molecular weight solvent for ethylene glycol is also recovered and recycled.

EXAMPLES 50 grams of carnallite ($MgCl_2 \cdot KCl \cdot 6H_2O$) was added to 250 grams of ethylene glycol. This solution was heated to the point at which water began to distill from the solution. This distillation was continued until all of the water that had been contained in this precipitate was removed, leaving behind an anhydrous solution which contained magnesium chloride, potassium chloride and ethylene glycol. In this solution was suspended anhydrous potassium chloride. This KCl was removed by filtration and the remaining solution was then cooled to room temperature, and sufficient anhydrous ammonia was added to precipitate from this solution all of the magnesium chloride values obtained therein. After the precipitation of the magnesium chloride/ammonia complex was complete, the complex precipitate was filtered from the solution and washed with methanol saturated with ammonia. This washing removed all of the entrained ethylene glycol contained in the magnesium chloride ammonia complex precipitate. The precipitate cake also contains some potassium chloride. However, this potassium chloride may also be removed by washing with additional methanol saturated with ammonia. The potassium chloride recovered in the methanol wash as a solution in methanol may be recovered from said solution by distillation procedures.

Table I presents the results of treating the original carnallite-ethylene glycol mixture mentioned above as outlined.

TABLE I

| Complex Filter Cake | | Ethylene Glycol Filtrate | |
|---|---|---|---|
| Mg | 8.75% | Mg | 0.05% |
| K | 0.86% | K | 1.04% |
| Cl | 27.26% | Cl | 2.22% |
| $NH_3$ | 56.39% | | |

After MeOH (sat. $NH_3$) Wash

| Complex* Filter Cake | | Filtrate Wash Liquor | |
|---|---|---|---|
| Mg | 11.27% | Mg | None Detected |
| K | 0.43% | K | 0.09% |
| Cl | 33.82% | Cl | 0.13% |
| $NH_3$ | (remainder) | | |

*Additional washing can rid the complex filter cake completely of KCl.

Having described our invention and shown it's operation by example, we claim:

1. A process to beneficiate carnallite mineral ores for the purpose of recovering anhydrous $MgCl_2$ and KCl said process comprising the following steps:
   (a) Dissolving the carnallite mineral ores in the minimum amount of water required to obtain complete solubility, thereby obtaining a carnallite solution;
   (b) Filtering from the carnallite solution of (a) any residual precipitates which are not soluble in said solution, thereby obtaining a filtered solution;
   (c) Adding ethylene glycol to the filtered solution of (b) in sufficient quantity to solubilize all $MgCl_2$ present in said filtered solution, thereby obtaining an ethylene glycol-water-carnallite solution;
   (d) Dehydrating the ethylene glycol-water-carnallite solution of step (c) by distilling water therefrom, thereby obtaining an anhydrous solution of $MgCl_2$ in ethylene glycol which may contain up to about 2.0% KCl by weight and a precipitate of anhydrous potassium chloride, said precipitate then being removed and recovered from said solution of $MgCl_2$ in ethylene glycol, thereby obtaining an anhydrous solution of $MgCl_2$ in ethylene glycol;
   (e) Adding to the anhydrous solution of $MgCl_2$ in ethylene glycol anhydrous ammonia thereby forming a precipitate of $MgCl_2 \cdot 6NH_3$, said precipitate being filtered from solution, washed with a low molecular weight solvent for ethylene glycol, said solvent having been saturated with anhydrous ammonia prior to washing said precipitate, and recovering said washed precipitate of anhydrous $MgCl_2 \cdot 6NH_3$;
   (f) Heating the $MgCl_2 \cdot 6NH_3$ of (e) to temperatures sufficient to drive off all ammonia, thereby recovering anhydrous $MgCl_2$.

2. A method of removing trace quantities of potassium chloride from glycol wet filter cakes of $MgCl_2 \cdot 6NH_3$ containing trace quantities of potassium chloride which comprises washing said cakes with methanol saturated with ammonia in a quantity sufficient to remove the potassium chloride and the glycol from said cake.

* * * * *